United States Patent [19]

Hashimoto

[11] 4,164,663

[45] Aug. 14, 1979

[54] SEQUENTIAL CONTROL SIGNAL GENERATOR

[75] Inventor: Kazuo Hashimoto, Tokyo, Japan

[73] Assignee: Hashimoto Corporation, Tokyo, Japan

[21] Appl. No.: 839,008

[22] Filed: Oct. 3, 1977

[30] Foreign Application Priority Data

Oct. 1, 1976 [JP] Japan .................................. 51-118386

[51] Int. Cl.$^2$ .......................................... H04M 11/00
[52] U.S. Cl. .................................... 307/115; 179/6 E; 179/90 K
[58] Field of Search ................ 307/112, 113, 114, 115, 307/106, 107, 108; 179/90 K, 6 R, 6 E; 200/1 B, 160

[56] References Cited

U.S. PATENT DOCUMENTS 3,045,069  7/1962  Sontheimer .......................... 179/6 E
3,725,589  4/1973  Golden ................................. 179/6 E Primary Examiner—J. V. Truhe
Assistant Examiner—Morris Ginsburg
Attorney, Agent, or Firm—Gerald J. Ferguson, Jr.; Joseph J. Baker

[57] ABSTRACT

A sequential control signal generator which has at least first and second key switches and is adapted to provide a sequential control signal composed of control signals based on the actuation of the first and second key switches only when the second key switch is actuated after actuation of the first key switch. A further sequential control signal is provided only when the first key switch is actuated and then the second key switch is actuated within a predetermined time after completion of the first key switch actuation.

4 Claims, 2 Drawing Figures

SEQUENTIAL CONTROL SIGNAL GENERATOR

BACKGROUND OF THE INVENTION

1. Field of the Invention:

This invention relates to improvements in a sequential control signal generator which has a plurality of key switches and is adapted to produce a sequential control signal having a sequential arrangement of a plurality of control signals by a sequential operation of the key switches.

2. Description of the Prior Art:

A sequential control signal having a sequential arrangement of a plurality of control signals is employed for a remote control of a variety of devices to be controlled, such, for example, as an automatic answering telephone set.

The automatic answering telephone set has a function of reproducing an answering message recorded on a magnetic tape and sending the reproduced message to a calling party from an outside telephone set in response to a call from the calling party. Accordingly, the automatic answering telephone set requires control signals for reproducing and sending an answering message from the outside telephone set. The control signals needed for such an automatic answering telephone are, for instance, a control signal for fast forwarding the magnetic tape having recorded thereon the answering message, a control signal for rewinding the magnetic tape, a control signal for sustaining the answering message reproducing state, etc. Such a plurality of control signals are sequentially obtained by actuating a plurality of key switches one after another. The plurality of control signals thus obtained will hereinafter be referred to as the sequential control signals. An error in the order of arrangement of the sequential control signals will leads to an erroneous operation of the automatic answering telephone set. Now, let it be assumed that the automatic answering telephone set needs three control signals. For the sake of clarity, let it be assumed that these three control signals are first, second and third control signals and are obtained by the actuation of first, second and third key switches, respectively. Further, assume that unless the first control signal is followed by the second or third control signal, the automatic answering telephone set performs a faulty operation. In such a case, if the actuation of the second or third key switch precedes that of the first key switch, the result is a malfunction of the automatic answering telephone set. The second or third key switch operation before the first key switch operation will hereinafter be referred to as the erroneous key switch actuation.

In conventional sequential control signal generator for generating such a sequential control signal necessary for the automatic answering telephone set, no consideration is paid to the likelihood of the erroneous key switch actuation. Consequently, the conventional sequential control signal generators has the defect of producing a sequential control signal having a sequential arrangement of a plurality of control signals following the order of the erroneous key switch actuation.

SUMMARY OF THE INVENTION

Accordingly, an object of this invention is to provide a sequential control signal generator which is suitable for use as a device for generating the sequential control signal necessary for an automatic answering telephone set.

Another object of this invention is to provide a sequential control signal generator which has at least first and second key switch and in which when the second key switch is actuated after actuation of the first key switch, a sequential control signal having a first control signal based on the first key switch actuation followed by a second control signal based on the second key switch actuation is obtained and in which when the first key switch is actuated after actuation of the second key switch, a sequential control signal having the second control signal followed by the first control signal is not provided but instead only the first control signal is produced.

Another object of this invention is to provide a sequential control signal generator which has at least first and second key switches and in which when the second key switch is actuated after actuation of the first key switch in a time interval between the moment of completion of the first key switch actuation and a predetermined moment after the moment of completion of the first key switch actuation, a sequential control signal having a first control signal followed by a second control signal is produced and in which when the second key switch is actuated after the predetermined moment following the first key switch actuation, only the first control signal is provided.

Still another object of this invention is to provide a sequential control signal generator which at least first and second key switches and in which in the case where the second key switch is actuated after actuation of the first key switch in a time interval between the moment of completion of the first key switch actuation and a predetermined moment after the moment of completion of the first key switch actuation and then the first or second key switch is actuated in a time interval between the moment of completion of the second key switch actuation and a predetermined moment after the moment of completion of the second key switch actuation, a sequential control signal having a first control signal followed by a second control signal then followed by a first or second control signal is obtained and in which in the case where the second key switch is actuated after actuation of the first key switch in a time interval between the moment of completion of the first key switch actuation and the predetermined moment after the moment of completion of the first key switch actuation and then the first or second key switch is actuated after the predetermined moment following the moment of completion of the second key switch operation, a sequential control signal having the first control signal followed by the second control signal is provided.

Other objects, features and advantages of this invention will become apparent from the following description taken in conjunction with the accompanying drawings.

DESCRIPTION OF THE PREFERRED EMBODIMENTS

Figure 1:
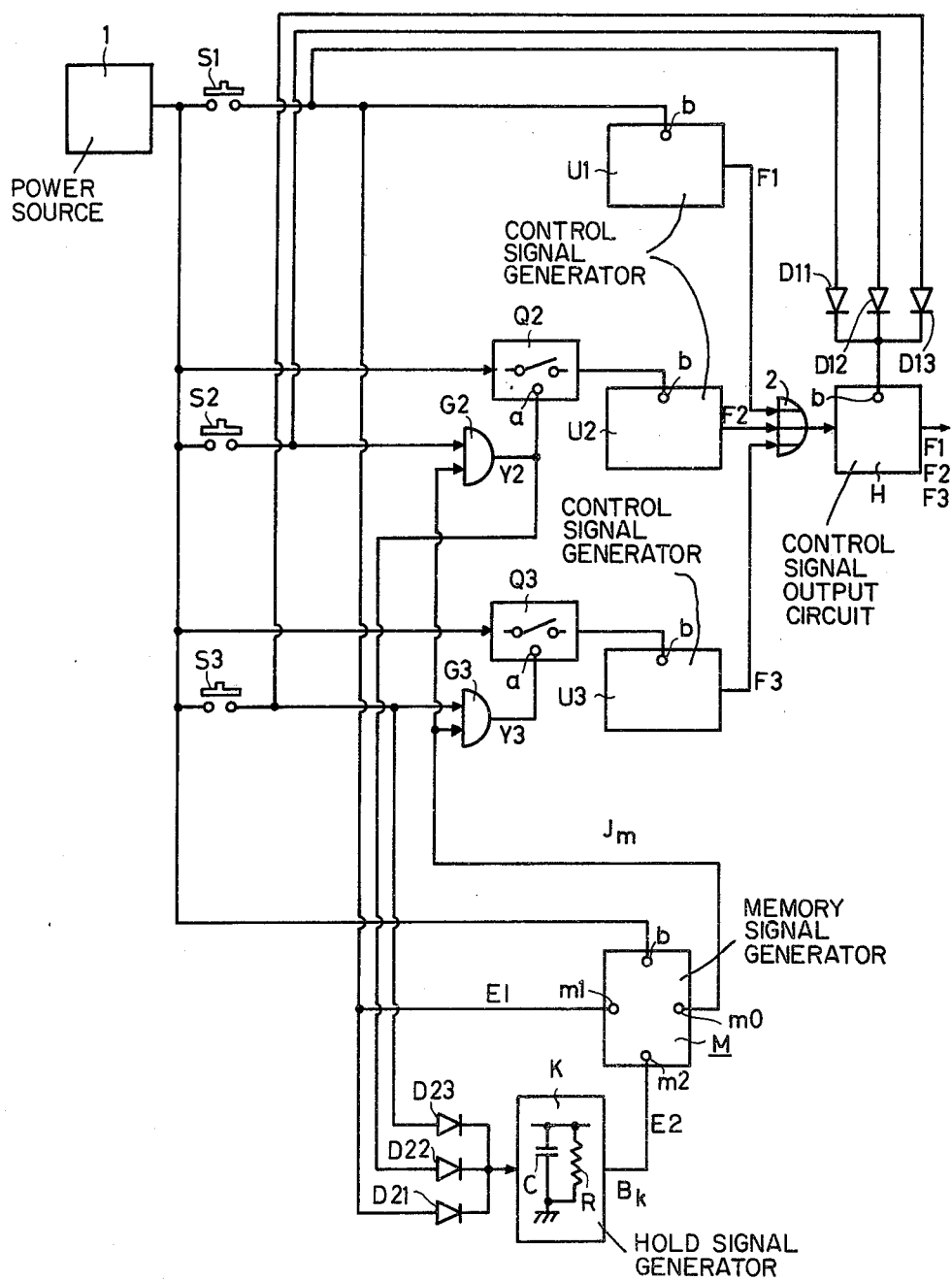
FIG. 1 is a connection diagram illustrating an embodiment of a sequential control signal generator of this invention.

FIG. 1 illustrates an embodiment of this invention, which has first, second and third key switches S1, S2 and S3 connected at one end to a DC power source 1 and two switching circuits Q2 and Q3, each connected at one end to the power source 1 and having a control input a. Further, there are provided a control signal generator U1 having a power source input b connected to the other end of the key switch S1 and control signal generators U2 and U3 respectively having power inputs b connected to the other ends of the switching circuits Q2 and Q3, respectively. Accordingly, the control signal generator U1 is adapted to provide a control signal F1 when its power source input b is connected to the power source 1 through the key switch S1. Similarly, the control signal generators U2 and U3 are designed to provide control signals F2 and F3 respectively when their power source inputs b are connected to the DC power source 1 through the switching circuits Q2 and Q3, respectively. In this case, the control signal generators U1, U2 and U3 are respectively formed, for instance, with oscillators of different oscillation frequencies, so that the control signals F1, F2 and F3 have different frequencies.

The control signals F1, F2 and F3 derived from the control signal generators U1, U2 and U3, respectively, are supplied through an OR circuit 2 to the input of a control signal output circuit H having a power source input b. The other ends of the key switches S1, S2 and S3 are connected to a power source input b of the control signal output circuit H, respectively, through diodes D11, D12 and D13 serving as unidirectional elements. Accordingly, when its power source input b is connected to the DC power source 1 through the key switches S1, S2 and S3, respectively, the control signal output circuit H becomes operative. Consequently, while the power source input b of the control signal output circuit H is connected to the DC power source 1 through the key switches S1, S2 and S3, if the control signals F1, F2 and F3 are provided from the control signal generators U1, U2 and U3, respectively, the control signals F1, F2 and F3 are derived from the control signal output circuit H. In this case, the control signal output circuit H may be formed with an amplifier.

For controlling the switching circuits Q2 and Q3, the other end of the key switches S1 is connected to the input of a hold signal generator K through a diode D21 serving as a unidirectional element. Further, the outputs of switching signal generators G2 described later and the other end of the key switch S3 are respectively connected to the input of the hold signal generator K through diodes D22 and D23 serving as unidirectional elements. The hold signal generator K is adapted such that each time supplied at its input with a DC input, it provides at its output a DC hold signal (identified generally by $B_k$) which lasts from the moment of application of the DC input or a moment a little behind it (which moment is identified generally by $t_{is}$) to a moment a predetermined time $T_0$ (which moment is identified generally by $t_{ie}$) behind the moment of termination of the DC input (which moment is identified generally by $t_{in}$). The hold signal generator K is constructed to include a charge and discharge circuit which has a capacitor C for rapidly charging the DC input and a resistor R of a relatively high resistance connected in parallel thereto and is adapted to provide the output from the hot side of the resistor R.

The hold signal $B_k$ derived from the hold signal generator K is supplied to one input m2 of the memory signal generator M whose power source input b is connected to the DC power source 1. The other input m1 of the memory signal generator M is connected to the other end of the key switch S1. The memory signal generator M is designed such that when supplied at its inputs m1 and m2 with DC inputs (identified generally by E1 and E2, respectively), it provides at its output m0 a DC memory signal (identified generally by Jm which lasts from the moment of simultaneous application of the both DC inputs to the moment of termination of the DC input E2 even if the DC input E1 terminates earlier than the DC input E2. The memory signal generator M is constructed to include the so-called D type flip-flop which has the two inputs corresponding to the inputs m1 and m2 and the output corresponding to the output m0.

The signal Jm provided from the memory signal generator M is supplied to one input of each of the switching circuits G2 and G3, which have the other ends connected to the key switches S2 and S3 on the opposite side from the DC power source 1. The switching signal generator G2 generates at its output a switching signal of DC (identified generally by Y2) only in the period in which DC inputs are simultaneously applied to the two inputs. Also, the switching signal generator G3 provides at its output a switching signal of DC (identified generally by Y3) only in the period in which DC inputs are simultaneously applied to the two inputs. These switching signal generators G2 and G3 each have the AND circuit structure.

The switching signal Y2 and Y3 from the switching signal generators G2 and G3 are applied to control inputs a of the switching circuits Q2 and Q3, respectively. When the switching circuits Q2 and Q3 are supplied at their control inputs with DC inputs, they remain in the ON state while being supplied with the DC inputs. These switching circuits may be formed with switching transistors.

The above is the construction of one embodiment of this invention. The operation of the embodiment will hereinbelow be described. Now, let it be assumed that only the key switch S1 is actuated to be ON between moments $t_{1S}$ and $t_{1N}$, as shown in FIG. 2A. In such an instance, in the time interval between $t_{1S}$ and $t_{1N}$, the power source input b of the control signal generator U1 is connected to the DC power source 1 through the key switch S1 and the power source input b of the control signal output circuit H is connected to the DC power source 1 through the diode D11 and the key switch S1, so that the control signal F1 is derived from the control signal output circuit H between the moments $t_{1S}$ and $t_{1N}$, as depicted in FIG. 2C. Further, since the input of the hold signal generator K is connected to the DC power source 1 through the diode D21 and the key switch S1 in the period between $t_{1S}$ and $t_{1N}$, a hold signal $B_1$ which lasts from the moment $t_{1S}$ or a moment $t_{1S}'$ a little behind (indicated by $t_{1S}$ in FIG. 2B) to a moment $t_{1e}$ a predetermined time $T_0$ behind the moment $t_{1N}$, as shown in FIG. 2B, is derived from the hold signal generator K as one of the hold signals $B_k$. Further, since the input of the memory signal generator M is connected to the DC power source 1 through the key switch S1 in the period between the moments $t_{1S}$ and $t_{1N}$, the memory signal generator M provides a memory signal $J_1$ as one of the above-said memory signals $J_m$ in the period in which the hold signal $B_1$ is obtained.

Assume that the key switch S1 is actuated from the moment $t_{1S}$ to $t_{1N}$, as depicted in FIG. 2A, that the key switch S2 is actuated to be ON from the moment $t_{2S}$ in the period from the moment $t_{1N}$ to $T_{1N}$ and that the key switch S2 is held ON in the period from the moment $t_{2S}$ to the moment $t_{2N}$ (the moment $t_{2N}$ may be a moment before the moment $t_{1e}$ as shown in FIG. 2D or a moment after the moment $t_{1e}$. In such a case, since one input of the switching signal generator G2 is connected to the DC power source 1 through the key switch S2 between the moments $t_{2S}$ and $t_{2N}$ and since the other input of the switching signal generator G2 is supplied with the hold signal $B_1$ at the moment $t_{2S}$, the switching signal generator G2 provides at its output the switching signal Y2 from the moment $t_{2S}$. The switching signal Y2 is supplied to the input of the hold signal generator K through the diode D22. Accordingly, the hold signal generator K provides, as another hold signal $B_k$, such a hold signal $B_2$ as shown in FIG. 2E which rises at the moment $t_{1S}$ or $t_{1S}'$ a little behind and lasts to the moment $t_{2e}$ the predetermined time $T_0$ after the moment $t_{2N}$. And the memory signal generator M provides, as another memory signal $J_m$, a signal $J_2$ in the period in which the hold signal $B_2$ is obtained. Further, the switching signal generator G2 produces the switching signal Y2 from the moment $t_{2S}$ to $t_{2N}$. Consequently, the switching circuit Q2 is held in the ON state from the moment $t_{2S}$ to $t_{2N}$ to connect therethrough the power source input b of the control signal generator U2 to the DC power source 1 in the abovesaid period. On the other hand, the power source input b of the control signal output circuit H is connected to the DC power source 1 through the diode D12 and the key switch S2 from the moment $t_{2S}$ to $t_{2N}$. As a result of this, the control signal F2 is provided from the control signal generator H in the period between the moments $t_{2S}$ and $t_{2N}$, as depicted in FIG. 2F.

Figure 2:
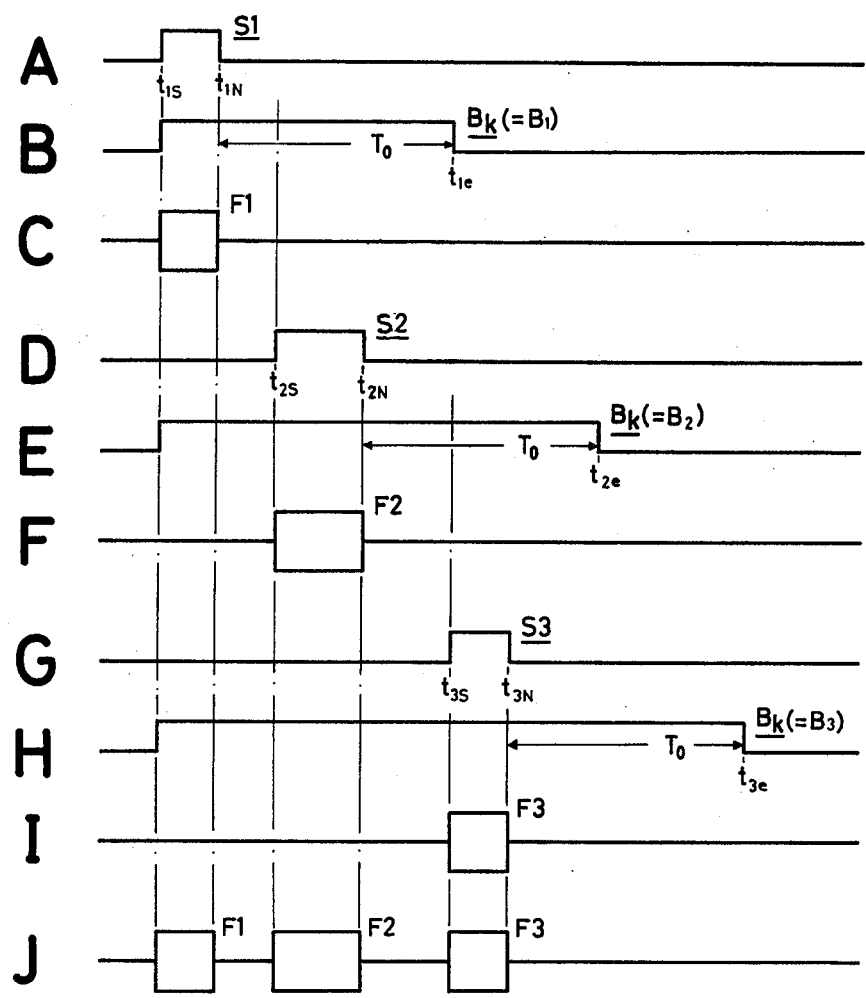
FIG. 2 is a waveform diagram explanatory of its operation.

Further, let it be assumed that the key switch S1 is actuated from the moment $t_{1S}$ to $t_{1N}$, as shown in FIG. 2A, that the key switch S2 is actuated from the moment $t_{2S}$ to $t_{2N}$, as depicted in FIG. 2D, and that the key switch S3 is actuated to be ON from the moment $t_{3S}$ in the time interval between the moments $t_{2N}$ and $t_{2e}$ to the moment $t_{3N}$ before the moment $t_{2e}$, as shown in FIG. 2G or after the moment $t_{2e}$. In such an instance, one input of the switching signal generator G3 is connected to the DC power source 1 through the key switch S3 between the moments $t_{3S}$ and $t_{3N}$. On the other hand, the other input of the switching signal generator G3 is supplied with the memory signal $J_2$ at the moment $t_{3S}$ and the power source input of the hold signal generator K is connected to the DC power source 1 through the key switch S3 between the moments $t_{3S}$ and $t_{3N}$. Consequently, the circuit K produces, as another hold signal $B_k$, such a hold signal $B_3$ as shown in FIG. 2H which rises up at the moment $t_{1S}$ or $t_{1S}'$ ($t_{1S}$ in FIG. 2) a little behind and lasts to the moment $t_{3e}$ the predetermined time $T_0$ after the moment $t_{3N}$. And, in the period in which the hold signal $B_3$ is obtained, a memory signal $J_3$ is provided as another memory signal $J_m$ from the memory signal generator M. Accordingly, the switching signal generator G3 provides at its output the switching signal Y3 between the moments $t_{3S}$ and $t_{3N}$. Consequently, the switching circuit Q3 is held in the ON state from the moment $t_{3S}$ to $t_{3N}$ to connect therethrough the power source input b of the control signal generator U3 to the power source 1 and, on the other hand, the power source input b of the control signal output circuit H is connected to the DC power source 1 through the diode D13 and the key switch S3 between the moments $t_{3S}$ to $t_{3N}$. As a result of this, the control signal output circuit H provides the control signal F3 between the moments $t_{3S}$ and $t_{3N}$, as shown in FIG. 2I.

With the above construction, in the case where the key switch S1 is actuated and then the key switch S2 is actuated in the period from the moment $t_{1N}$ of completion of the first key switch actuation to the moment $t_{1e}$ the predetermined time $T_0$ behind the abovesaid moment $t_{1N}$, a sequential control signal is provided that the control signal F1 is followed by the control signal F2, as described above. In the case where the key switch S1 is actuated and then the key switch S2 in the period from the moment $t_{1N}$ of termination of the first key switch actuation to the moment $t_{1e}$ the predetermined time $T_0$ behind the moment $t_{1N}$ and then the key switch S3 is actuated in the period from the moment $t_{2N}$ of completion of the second key switch actuation to the moment $t_{2e}$ the predetermined time $T_0$ after the moment $t_{2N}$, such a sequential control signal as depicted in FIG. 2J is obtained in which the control signals F1, F2 and F3 are sequentially arranged. Further, though not described specifically, even if the key switch S3 is actuated after actuation of the first key switch in the period between the moment of completion of the first key switch actuation and a moment the predetermined time $T_0$ after the moment of completion of the first key switch actuation, a sequential control signal is produced which has a sequential arrangement of the first and third control signals F1 and F3. Also in the case where the key switch S3 is actuated after actuation of the key switch S1 in the period from the moment of completion of the latter key switch actuation to the moment predetermined time $T_0$ after the above-said moment and then the key switch S2 (or S1) is actuated in the period from the moment of completion of the key switch S3 actuation to the moment the predetermined time $T_0$ behind, a sequential control signal is provided in which the control signals are arranged in the sequential order F1-F3-F2 (or F1). Moreover, with the construction described above, in the case where, after actuation of the key switch S1, a desired one of the key switches S1 to S3 is actuated and then a desired one of the key switches S1 to S3 is actuated and thereafter similar operation is repeated, such a sequential control signal is provided in which the control signal F1, one of the control signals F1 to F3, one of the control signals F1 to F3, . . . are sequentially arranged. In this case, however, the key switch to be actuated (i+1)th time (i=1,2. . . ) must be actuated within the period between the moment of completion of the ith key switch actuation and a moment the predetermined time $T_0$ behind.

With the abovesaid construction, however, even where the key switch S1 is turned ON between the moments $T_{1S}$ and $t_{1N}$ and then the key switch S2 is turned ON after the abovesaid moment $t_{1e}$, the switching signal Y2 cannot be obtained from the switching signal generator G2 since the memory signal $J_1$ is not provided from the memory signal generator M after the moment $t_{1e}$. Accordingly, the switching circuit Q2 is not turned ON, so that the control signal F2 is not provided. As a result of this, although the control signal F1 is obtained, a sequential control signal composed of the control signals F1 and F2 cannot be obtained. Further, in the case where the key switch S1 is turned ON in the period between the moments $t_{1S}$ and $t_{1N}$ as mentioned above and then the key switch S2 is turned ON in the period between the moments $t_{2S}$ and $t_{2N}$ and then the key switch S3 is turned ON after the aforementioned moment $t_{2e}$, since the memory signal $J_2$ obtained until the moment $t_{2e}$ is not produced thereafter, the switching signal Y3 is not provided, so that the switching circuit Q3 is not turned ON and accordingly the control signal F3 is not obtained. That is, a sequential control signal composed of the control signals F1 and F2 is obtained but a sequential control signal composed of the control signals F1, F2 and F3 cannot be produced. Moreover, in the case where the key switch S1 is actuated and then a desired one of the key switches S1 to S3 is actuated and thereafter similar key switch actuation is repeated, the key switch to be actuated (j+1)th (j=1,2 ... j) is actuated within the period between the moment of completion of the jth key switch actuation and a moment the predetermined time $T_0$ behind. But if the (j+2)th key switch is actuated after the moment the predetermined time $T_0$ behind the moment of completion of the (j+1)th key switch, only a sequential control signal is provided which is composed of the control signals based on the key switches to the (j+1)th one.

Further, in the case where the key switch S2 (or S3) other than S1 is actuated first and then the key switch S1 is actuated at a moment between the moment of completion of the key switch S2 (or S3) actuation and the moment the predetermined time $T_0$ behind, the hold signal $B_k$ and consequently the memory signal Jm is not produced before the key switch S1 is actuated, as is evident from the above. Accordingly, the switching signal Y2 (or Y3) is not provided and the switching circuit Q2 (or Q3) is not turned ON, so that the control signal F1 (or F2) based on the key switch S2 (or S3) is not produced. In the case where the key switch S2 (or S3) other than S1 is actuated first N times and then the key switch S1 is actuated (N+1)th time and further a desired one of the key switch is actuated a desired number of times, a sequential control signal is produced which is composed of the control signal based on the (N+1)th key switch S1 actuation and the control signals based on the subsequent key switch actuation, but a sequential control signal which includes the control signals based on the key switch actuation prior to the Nth key switch operation.

With the construction described above in connection with FIG. 1, even if a desired one of the key switches S2 to S3 before actuation of the key switch S1, the control signal based on the latter is not provided. Accordingly, if actuation of a desired one of the key switches S2 and S3 without actuating S1 is considered to be an erroneous key switch actuation, this invention produces the effect of eliminating the possibility of providing a control signal by such an erroneous key switch actuation. Accordingly, this invention is of particular utility when applied, for instance, to a device for providing a sequential control signal necessary for the automatic answering telephone set described previously.

The foregoing embodiment should be construed as being merely illustrative of this invention and should not be construed as limiting this invention specifically thereto. For example, in the construction described with regard to FIG. 1, the key switch S3, the switching signal generator G3, the switching circuit Q3 and the control signal generator U3 can be omitted. Further, the input of the hold signal generator K need not always be connected to the output of the switching signal generator G2 but may also be connected to the key switch S2 on the opposite side from the DC power source 1. Moreover, the connection of the switching signal generator G2 and the key switch S3 to the input of the hold signal generator K may be omitted. It is also possible, of course, to provide more than three sets of one key switch, one switching signal generator, one switching circuit and one control signal generator.

It will be apparent that many modifications and variations may be effected without departing from the scope of novel concepts of this invention.

What is claimed is:

1. A sequential control signal generator comprising:
at least first and second control signal generators, each having a power source input;
a control signal output circuit responsive to signals from said control signal generators;
at least first and second key switches;
at least one switching circuit having a control input;
a DC power source connected to said power source input of said first control signal generator via said first key switch;
a hold signal generator having an input connected to said DC power source via said first key switch;
a memory signal generator having first and second inputs respectively connected to (a) said DC power source via said first key switch and (b) the output of said hold signal generator; and
at least one switching signal generator having first and second inputs respectively connected to (a) said DC power source via said second key switch and (b) the output of said memory signal generator and the output of said switching signal generator being connected to said control input of said switching circuit;
wherein when connected at the power source input to the DC power source through the first key switch, the first control signal generator provides a first control signal;
wherein when connected at the power source input to the DC power source through the switching circuit, the second control signal generator provides a second control signal;
wherein when sequentially supplied at its input with the first and second control signals, the control signal output circuit provides a sequential control signal having a sequential arrangement of the first and second control signals;
wherein when connected at the input to the DC power source through the first key switch, the hold signal generator provides a hold signal which lasts from the moment of connection of the input to the DC power source through the first key switch or a moment a little behind it to a predetermined moment after disconnection of the input from the DC power source through the first key switch;
wherein when connected at the first input to the DC power source through the first key switch and supplied at the second input with the hold signal, the memory signal generator generates a memory signal which lasts while the hold signal lasts;
wherein when connected at the first input to the DC power source through the second key switch and supplied at the second input with the memory signal, the switching signal generator provides a switching signal while connected at the first input to the DC power source through the second key switch; and wherein when supplied at the control input with the switching signal, the switching signal connects the power source input of the second control signal generator to the DC power source while the switching signal lasts.

2. A sequential control signal generator according to claim 1, wherein the control signal output circuit has a power source input and wherein the sequential control signal generator includes means for connecting the power source input to the DC power source through the first and second key switches.

3. A sequential control signal generator comprising:
at least first and second control signal generators, each having a power source input;
a control signal output circuit responsive to signals from said control signal generators;
at least first and second key switches;
at least one switching circuit having a control input;
a DC power source connected to said power source input of said first control signal generator via said first key switch;
a hold signal generator having an input connected to said DC power source via said first key switch;
a memory signal generator having first and second inputs respectively connected to (a) said DC power source via said first key switch and (b) the output of said hold signal generator; and
at least one switching signal generator having first and second inputs respectively connected to (a) said DC power source via said second key switch and (b) the output of said memory signal generator and the output of said switching signal generator being connected to said control input of said switching circuit;
wherein when connected at the power source input to the DC power source through the first key switch, the first control signal generator provides a first control signal;
wherein when connected at the power source input to the DC power souce through the switching circuit, the second control signal generator provides a second control signal;
wherein when sequentially supplied at its input with the first and second control signals, the control signal output circuit provides a sequential control signal having a sequential arrangement of the first and second control signals;
wherein when connected at its said input to the DC power source through the first key switch, the hold signal generator provides a first hold signal which lasts from the moment of connection of the input to the DC power source through the first key switch or a moment a little behind it to a predetermined moment after disconnection of the input from the DC power source through the first key switch, when the first input of the switching signal generator is connected to the DC power source through the second key switch in a time interval between the moment of disconnection of the input from the DC power source through the first key switch and the predetermined moment after disconnection of the input from the DC power source through the first key switch, the hold signal generator provides a second hold signal which lasts from the moment of connection of the input to the DC power source through the first key switch or a moment a little behind it to the predetermined moment after disconnection of the first input of the switching signal generator lfrom the DC power source through the second key switch;
wherein when connected at the first input to the DC power source through the first key switch and supplied at the second input with either one of the first and second hold signals, the memory signal generator generates a memory signal which lasts while either one of the first and second hold signals last;
wherein when connected at the first input to the DC power source through the second key switch and supplied at the second input with the memory signal, the switching signal generator provides a switching signal while connected at the first input to the DC power source through the second key switch; and
wherein when supplied at the control input with the switching signal, the switching circuit connects the power source input of the second control signal generator to the DC power source while the switching signal lasts.

4. A sequential control signal generator according to claim 3, wherein the control signal output circuit has a power source input and wherein the sequential control signal generator includes means for connecting the power source input to the DC power source through the first and second key switches.

* * * * *